United States Patent
Levy et al.

(10) Patent No.: US 6,506,043 B1
(45) Date of Patent: Jan. 14, 2003

(54) PASTE EXTRUSION APPARATUS

(75) Inventors: Daniel N. Levy, Collex (CH); Fabrice Aubertin, Segny (FR)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/710,964

(22) Filed: Nov. 13, 2000

Related U.S. Application Data

(62) Division of application No. 09/123,110, filed on Jul. 27, 1998, now Pat. No. 6,174,473.
(60) Provisional application No. 60/054,893, filed on Aug. 7, 1997.

(51) Int. Cl.[7] ............................................. B29C 47/24
(52) U.S. Cl. ..................... 425/380; 425/382.4; 425/467
(58) Field of Search ............................. 425/380, 382.4, 425/467, 382.3, 381

(56) References Cited

U.S. PATENT DOCUMENTS

| | | | |
|---|---|---|---|
| 2,685,707 A | 10/1954 | Llewellyn et al. ........... | 264/127 |
| 3,008,187 A | 11/1961 | Slade ......................... | 264/119 |
| 3,295,166 A | 1/1967 | Owings ...................... | 118/125 |
| 3,315,020 A | 4/1967 | Gore .......................... | 264/120 |
| 3,327,038 A * | 6/1967 | Fox ........................... | 264/209.2 |
| 4,021,170 A * | 5/1977 | Andersen et al. ......... | 264/209.1 |
| 4,056,591 A * | 11/1977 | Goettler et al. ............. | 138/174 |
| 4,225,547 A | 9/1980 | Okita ......................... | 264/127 |
| 4,250,138 A | 2/1981 | Okita ......................... | 264/568 |
| 4,662,835 A * | 5/1987 | Fukuda et al. .............. | 425/145 |
| 4,876,051 A | 10/1989 | Campbell et al. ........... | 264/127 |
| 5,307,843 A * | 5/1994 | Jarrin et al. ................. | 138/174 |
| 5,321,109 A | 6/1994 | Bosse et al. ................ | 526/255 |
| 5,466,402 A * | 11/1995 | Lupke ..................... | 264/171.12 |
| 5,505,887 A | 4/1996 | Zdrahala et al. ............ | 264/127 |
| 5,518,676 A * | 5/1996 | de Rocheprise ........... | 264/127 |
| 5,874,032 A | 2/1999 | Zdrahala et al. ............ | 264/127 |

FOREIGN PATENT DOCUMENTS

EP 0644037 9/1993

* cited by examiner

*Primary Examiner*—Jan H. Silbaugh
*Assistant Examiner*—Joseph S Del Sole

(57) ABSTRACT

An extrusion head for use in the paste extrusion of lubricated PTFE fine powder, the extrusion head comprising an external die having an inlet, a chamber, and an outlet, a tip positioned in the chamber of the die, the tip having a circumferential ridge formed therein that extends into the chamber, the chamber having a shape complementary to the ridge so as to form a space between the external die and the tip to allow lubricated PTFE fine powder to pass therethrough, and a mandrel which extends through the external die and supports the tip in the chamber.

1 Claim, 7 Drawing Sheets

PASTE EXTRUSION APPARATUS

This is a divisional of application Ser. No. 09/123,110, filed Jul. 27, 1998, and now U.S. Pat. No. 6,174,473 B1. Which is a Non Prov. of Provisional Application No. 60/054, 893 filed Aug. 7, 1997.

BACKGROUND OF THE INVENTION

1. Field of the Invention

This invention relates to a method of paste extrusion of lubricated polytetrafluoroethylene fine powder.

2. Description of the Related Art

Polytetrafluoroethylene (PTFE) fine powder is a type of PTFE that is made by aqueous dispersion polymerization, followed by coagulation of the dispersion and drying of the resultant coagulum to obtain the fine powder. Because the PTFE fine powder does not flow in the melt condition, the powder has been fabricated into an article by an extrusion method which does not require melt flow. This extrusion method is known as paste extrusion and is described for example in U.S. Pat. No. 2,685,707. In paste extrusion, a paste extrusion composition is formed by mixing PTFE fine powder with an organic lubricant which has a viscosity of at least 0.45 centipoise at 25° C. and is liquid under the conditions of subsequent extrusion. The PTFE soaks up the lubricant, resulting in a dry, pressure coalescing paste extrusion composition that is also referred to as lubricated PTFE fine powder.

The process of paste extrusion may be understood with reference to FIG. 1 wherein there is shown an extrusion device 1 having a barrel section 3 and a die section 5. Inside device 1 there is defined a chamber 7 which terminates in an extrusion orifice 9. Lubricated PTFE fine powder, usually as a charge shaped under pressure to conform to chamber 7, is placed in chamber 7 and is then "paste extruded" by a ram 11 positioned in chamber 7 at the end opposite extrusion orifice 9 which moves toward extrusion orifice 9 to force the lubricated PTFE fine powder through extrusion orifice 9. Typically, there is a mandrel 13 positioned in chamber 7 so that the lubricated PTFE fine powder is paste extruded in the form of a sheet, rod, tubing or coating. The lubricated extrudate is also known as a lubricated green extrudate.

In FIG. 2 there is shown an extrusion device which has a mandrel with a configuration different from that in FIG. 1. Specifically, there is shown an extrusion device 21 having a barrel 23 defining a chamber 25. A ram 27 is positioned at one end of chamber 25. A mandrel 29 is fixed within chamber 25 and has a cylinder 31 attached at its distal end. Cylinder 31 has a conical surface and a cylindrical surface. As lubricated PTFE fine powder is paste extruded, the powder is pushed by ram 27 through chamber 25, flows around cylinder 31 and out of extrusion device 21 as extruded tube 32.

The lubricated green extrudate produced by paste extrusion may also be formed into an article of a desired shape. The paste extrusion is usually carried out at a temperature of 20 to 50° C., though extrusion temperatures outside this range are known.

In most cases, the lubricated green extrudate is then heated, usually at a temperature of 100 to 250° C., to make volatile and drive off the lubricant from the extrudate, followed by the optional step of sintering the PTFE. Some articles such as thread sealant tape are calendered and cut after drying, and are not subjected to sintering.

Lubricated PTFE fine powder includes PTFE primary particles which, during paste extrusion, are deformed into small interconnected fiber-like clusters, called fibrils. In the devices in both FIGS. 1 and 2, the lubricated PTFE fine powder is shaped into fibrils as it is forced around the mandrel and through the end of the extrusion device. In FIG. 1, this fibrillation occurs in the area between mandrel 13 and the walls of chamber 7 in die section 5. In FIG. 2, fibrillation occurs in the area between cylinder 31 and barrel 23.

These fibrils are oriented in the direction of the paste extrusion which means that after extrusion in devices such as are shown in FIGS. 1 and 2, the lubricated extrudate and articles formed therefrom are strong in the extrusion direction, but particularly weak in the extrusion-cross direction. For example, the fibrils formed by paste extrusion in device 21 in FIG. 2 are oriented in one direction, vertically, as the fibrils pass out of device 21. This weakness in the extrusion cross direction means that special care has to be taken to handle the lubricated extrudate before subsequent drying and optional sintering.

The anisotropy in properties of lubricated extrudate may be corrected after extrusion by stretching the extrudate or articles formed therefrom in two or more different directions, thereby reorienting the fibrils. Techniques of fibril reorientation by multi-lateral stretching of unsintered PTFE extrudate are known in the art such as are described in U.S. Pat. No. 5,321,109. Reorientation of the fibrils formed in the extrusion direction may also be accomplished by reorientation within the extrusion process. In each case, the prior art teaches forming the fibrils in the direction of the extrusion and then subsequently disorienting the fibrils by various methods, such as with expansion chambers, as shown in U.S. Pat. No. 3,315,020, or by applying a spiral-type movement to the lubricated extrudate, as shown in U.S. Pat. No. 3,008,187 and U.S. Pat. No. 4,876,051. It is shown in the literature that the anisotropy in the unsintered lubricated green extrudate or articles made therefrom is generally extended to the sintered finished articles. This anisotropy may be compensated by subjecting the articles to long sintering cycles, but this is cumbersome and expensive. Increased isotropy achieved before sintering is usually also found in the sintered finished articles.

Further, even when the lubricated extrudate is subject to the prior art processes of stretching, the resultant articles are still difficult to handle and still have undesirable physical properties, including shrinkage in the extrusion direction.

SUMMARY OF THE INVENTION

The present invention relates to a process of paste extruding lubricated PTFE fine powder in an extrusion device by forcing the lubricated PTFE fine powder through the extrusion device and out of an orifice as a lubricated green extrudate, wherein before exiting through the orifice, the direction of the flow of the lubricated PTFE fine powder in the extrusion device is reoriented in a direction at least 60 degrees different from the initial direction of the flow of the lubricated PTFE fine powder through the extrusion device.

DETAILED DESCRIPTION

This invention relates to a process for paste extruding fluoropolymers, and in particular for paste extruding lubricated PTFE fine powder. Lubricated PTFE fine powder comprises PTFE particles, and when the lubricated PTFE fine powder is paste extruded, the PTFE particles form fibrils. These fibrils are oriented in the direction of the paste extrusion, that is, the fibrils elongate in the same direction as the particles are extruded.

In the inventive process, the lubricated PTFE fine powder is paste extruded such that the flow of the lubricated PTFE fine powder is reoriented during extrusion at least 60 degrees from the initial direction of the flow of the lubricated PTFE fine powder. This process results in an extrudate which is malleable to an extent heretofore not obtainable using conventional processes. Further, the lubricated extrudate, as well as the dried extrudate, exhibits unexpected and surprising increases in biaxial green strength.

Figure 3:
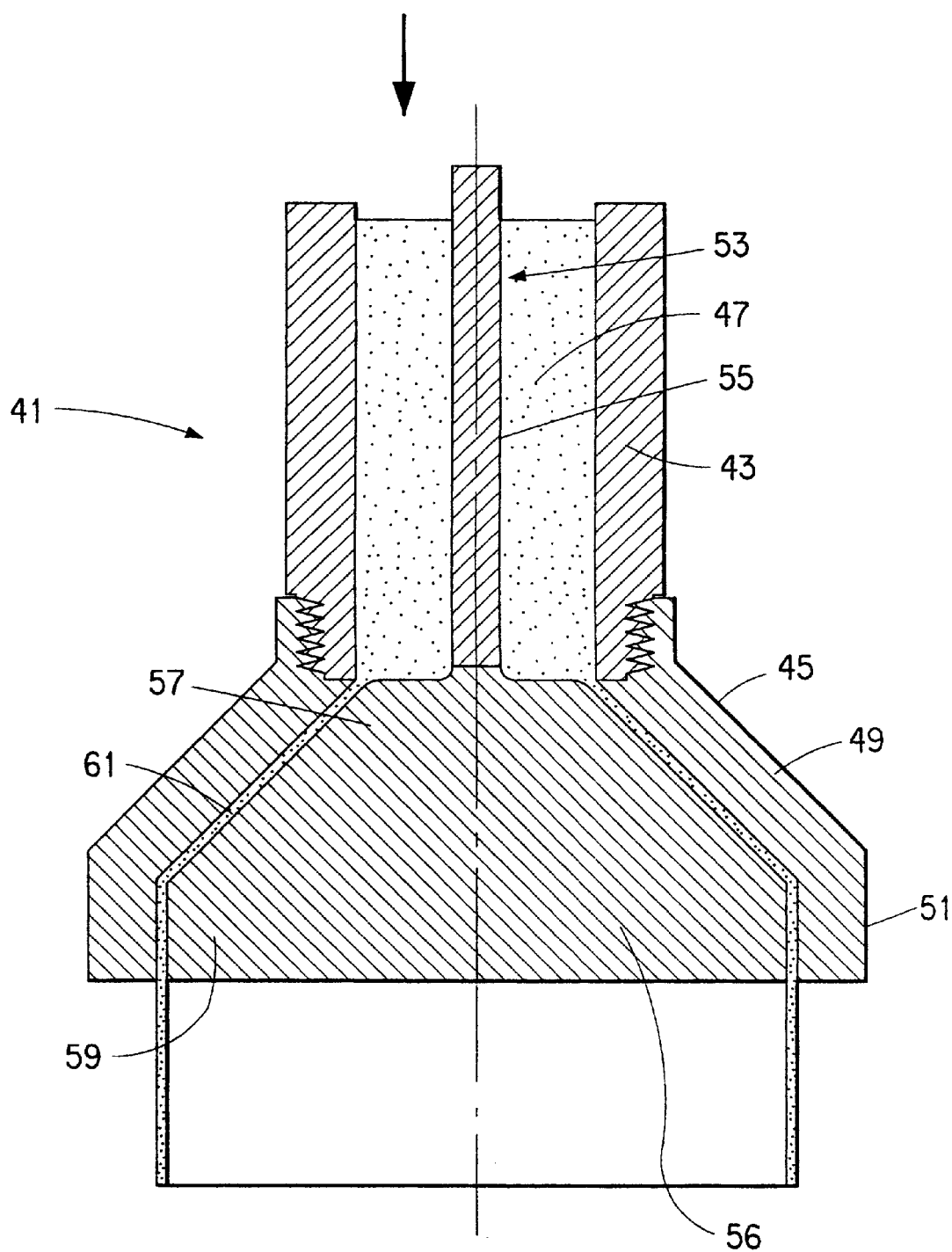
FIG. 3 is a side view in cross section of an extrusion head constructed in accordance with this invention, said extrusion head including a die and a mandrel, wherein lubricated PTFE fine particles are reoriented in a direction at least 60 degrees different from the initial direction of the flow of the lubricated PTFE fine powder through the extrusion head.

This invention may be further understood by referring to FIG. 3. In FIG. 3 there is shown an extrusion head 41 comprising a die 45 and a tip 56 positioned in die 45. Conventionally, extrusion head 41 is attached to an extrusion device such as by a barrel 43 that is connected to die 45 and which together define a chamber 47. In barrel 43 chamber 47 has a diameter D1. Die 45 has a frustoconical portion 49 and a cylindrical portion 51, so that the diameter of chamber 47 gradually increases to a diameter D2 in cylindrical portion 51. The walls of frustoconical portion 49 of die 45 extend outwardly 60 degrees from the walls of barrel 43.

A mandrel 53 is positioned in extrusion device 41, and includes a rod 55 that extends through barrel 43 and connects to tip 56. Tip 56 has a frustoconical portion 57 and a cylindrical portion 59. Frustoconical portion 57 and a cylindrical portion 59 are sized so as to complement die 45 and form a uniform space 61 between die 45 and mandrel 53 to allow the lubricated PTFE fine powder to flow between them.

The direction of flow of the lubricated PTFE fine powder in extrusion head 41 is indicated by an arrow in FIG. 3. As the powder moves through chamber 47 in barrel 45, the powder contacts the frustoconical portion 57 of tip 56 at which point the powder, and consequently the PTFE fibrils in the powder, is reoriented at an angle of 60 degrees from the initial direction of flow of the powder. The lubricated PTFE fine powder is reoriented 60 degrees again as it reaches cylindrical portion 51 of die 45 so that the extruded paste flows from extrusion head 41 in approximately the same direction as the initial direction of flow of the lubricated PTFE fine powder.

The PTFE particles in the lubricated PTFE fine powder are fibrillated in space 61 to form fibrils which are oriented in directions other than the extrusion direction. It has been found that when the direction of flow of the lubricated PTFE powder is reoriented at least 60 degrees, the lubricated extrudate and the dried articles formed from the lubricated extrudate exhibit unexpected increases in tensile strength, yield strength, and percent elongation at break.

The hollow form of extrudate made using extrusion head 41 may be cut open to yield flat sheets of various shapes and sizes. It is preferred that mandrel 53 is centered at all times during the paste extrusion process to allow for the formation of a lubricated extrudate with walls of a uniform thickness.

Figure 5:
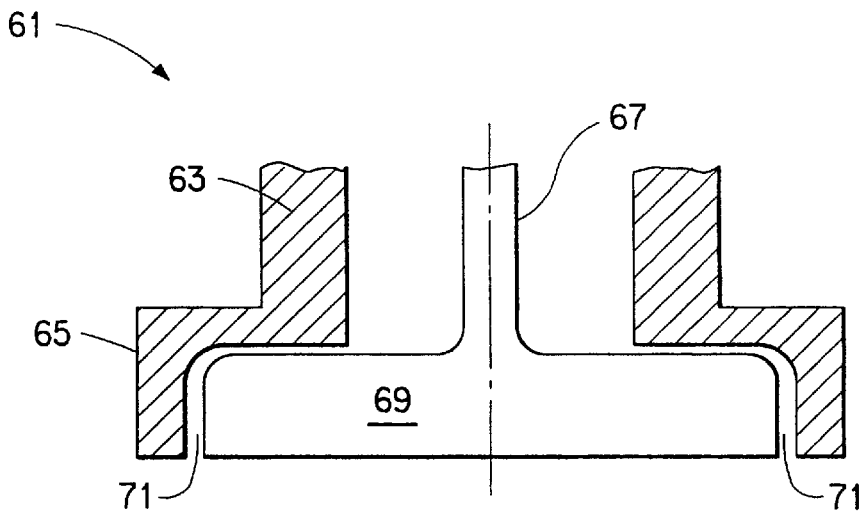
FIG. 5 is a side view in cross section of an extrusion head in accordance with this invention wherein the lubricated PTFE fine powder flows in a direction perpendicular to the initial direction of the flow of the lubricated PTFE fine powder through the extrusion head.

In another aspect of this invention, the flow of lubricated PTFE powder through the extrusion head is reoriented so that before exiting through the orifice the lubricated PTFE fine powder flows in a direction 90 degrees different from the initial direction of the flow of the lubricated PTFE fine powder through the extrusion head. In this case, all the fibrillation occurs in a direction perpendicular to that of the extrusion. In FIG. 5 there is shown an extrusion head 61 having a die 65 having a barrel 63 connected thereto which define a space 71. A tip 69 having a mandrel 67 is positioned in die 65, with mandrel 67 extending upwardly into barrel 63. Tip 69 has a flat upper surface so that when lubricated PTFE fine powder flowing through extrusion head 61 contacts tip 69 the direction of flow of the lubricated PTFE fine powder is reoriented 90 degrees from its initial direction of flow. The lubricated PTFE fine powder is reoriented 90 degrees again as it reaches the wall of die 65 so that the extruded paste flows from extrusion head 61 in approximately the same direction as the initial direction of flow of the lubricated PTFE fine powder.

Again, the biaxial orientation of the fibrils that occurs in space 71 results in a lubricated green extrudate having increased biaxial green strength. The extrudate and the dried articles formed from the lubricated extrudate exhibit unexpected increases in tensile strength, yield strength, and percent elongation at break.

A problem that sometimes occurs in paste extrusion is that the mandrel in the extrusion device is pushed off center. Lubricated PTFE fine powder used in paste extrusion is often not homogeneous, in particular when compared to other thermoprocessable plastics that are melt extruded. Consequently, the rate of fibrillation may momentarily vary which results in a variation of the developed extrusion pressure. If this variation is not uniform around the mandrel, the mandrel is pushed off center.

Figure 4:
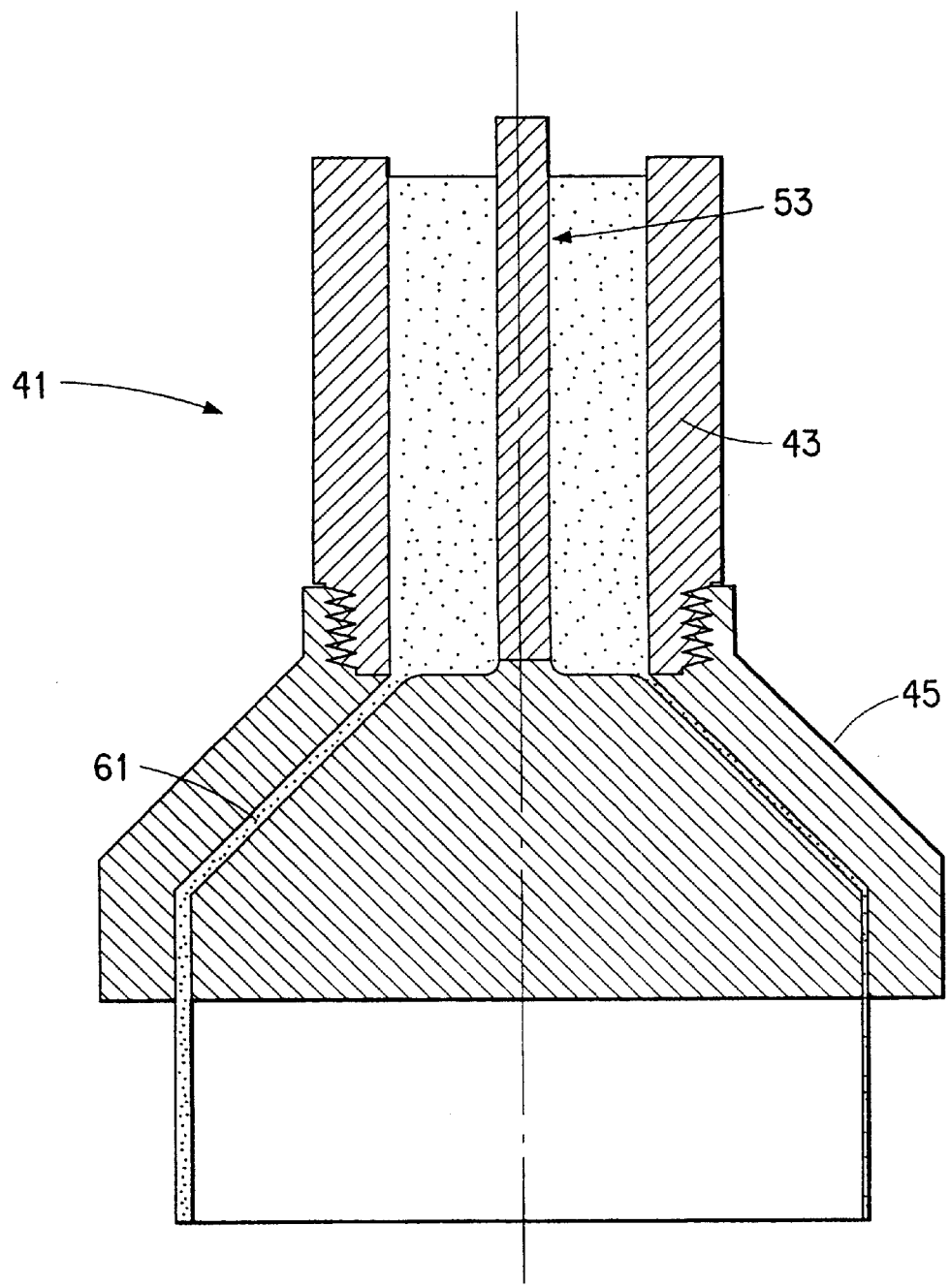
FIG. 4 shows the extrusion head of FIG. 3 wherein the mandrel is not centered.

As is shown in FIG. 4, once mandrel 53 is pushed off-center, the lubricated paste takes the path of less resistance, that is, the path where the space 61 is larger, and there is no driving force to move mandrel 53 back to a centered position. When this happens, the thickness of the hollow object being extruded is no longer uniform along its cross-section.

Figure 6:
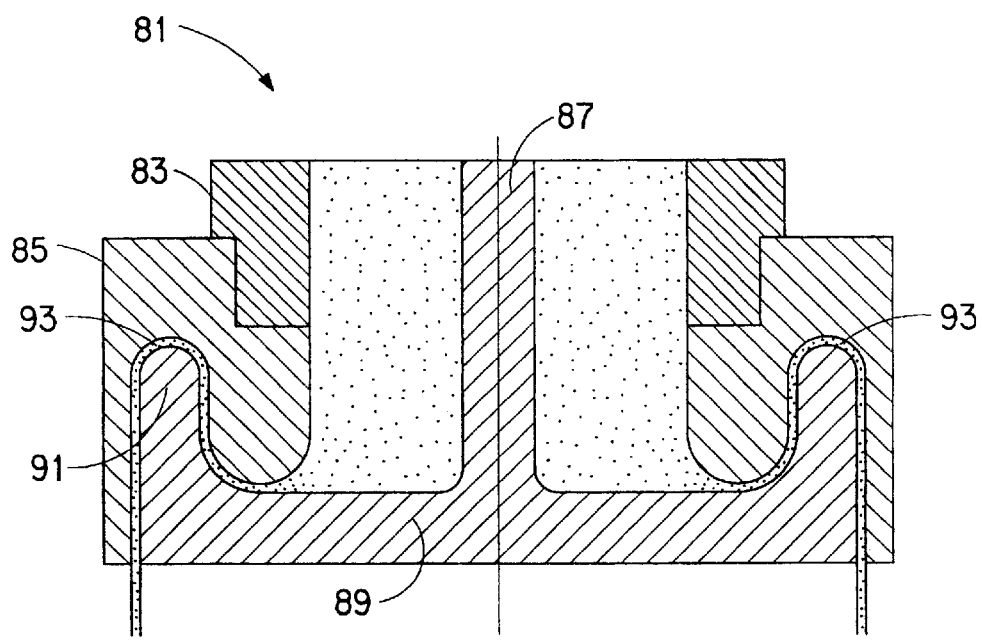
FIG. 6 is a side view in cross section of an extrusion head in accordance with this invention wherein the lubricated PTFE fine powder flows in a direction opposite to the initial direction of the flow of the lubricated PTFE fine powder through the extrusion head.

In a preferred embodiment of the invention, the tip used in the extrusion head is self centering such as is shown in FIG. 6. Turning to FIG. 6, there is shown an extrusion head; 81 having a die 85 and a tip 89 positioned in die 85. Conventionally, extrusion head 41 is attached to an extrusion device such as by barrel 83 that is connected to die 85. Tip 89 is connected to a mandrel 87 that is positioned in barrel 83 and die 85. Tip 89 includes an upwardly extending circumferential ridge 91 which mates with die 85 to form a uniform space 93 between die 85 and mandrel 87. When lubricated PTFE fine powder flowing through extrusion head 81 contacts tip 89 of mandrel 87, the direction of flow of the lubricated PTFE fine powder is reoriented 180 degrees from its initial direction of flow. The direction of flow of the lubricated PTFE fine powder is reoriented 180 degrees again as the powder contacts the wall of die 85 so that the extruded paste flows from extrusion head 81 in approximately the same direction as the initial direction of flow of the lubricated PTFE fine powder.

The design of die 83 and tip 89 allows tip 89 to be self centering because the lubricated PTFE fine powder follows a parallel path in opposite directions that automatically corrects any unbalanced forces that move tip 89 off-center. If non-uniform flow of the powder pushes tip 89 off-center, the total paths become balanced in cross-section. In other words, if the flow of powder on circumferential ridge 91 becomes constricted during the first 180 degree reorientation of the powder, the flow of powder on circumferential ridge 91 on the other side of tip 89 during the first 180 degree reorientation of the powder increases, shifting tip 89 and mandrel 87 off center. As this increased flow of powder goes up and over circumferential ridge 91, it pushes tip 89 and mandrel 87 back toward a centered position until the flow of powder is again balanced in space 93.

Figure 8:
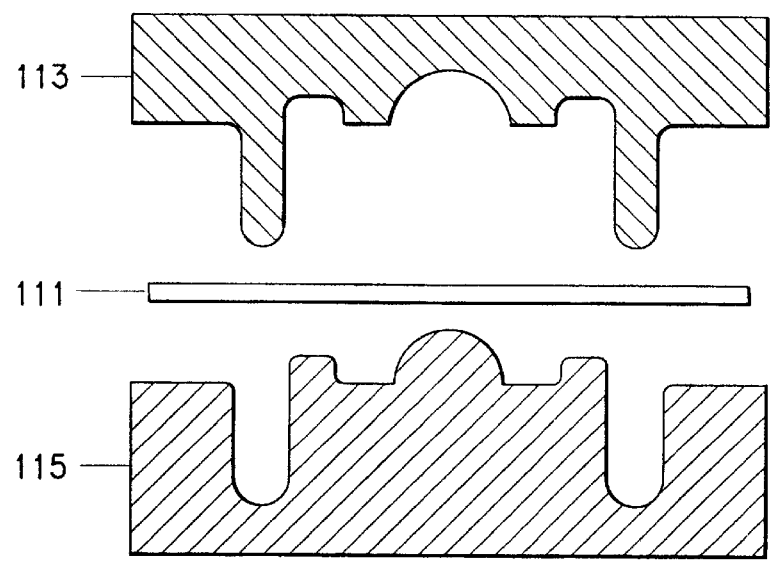
FIG. 8 is a side view in cross section of the top and bottom sections of a mold between which is positioned an extrudate made according to the present invention.
Figure 9:
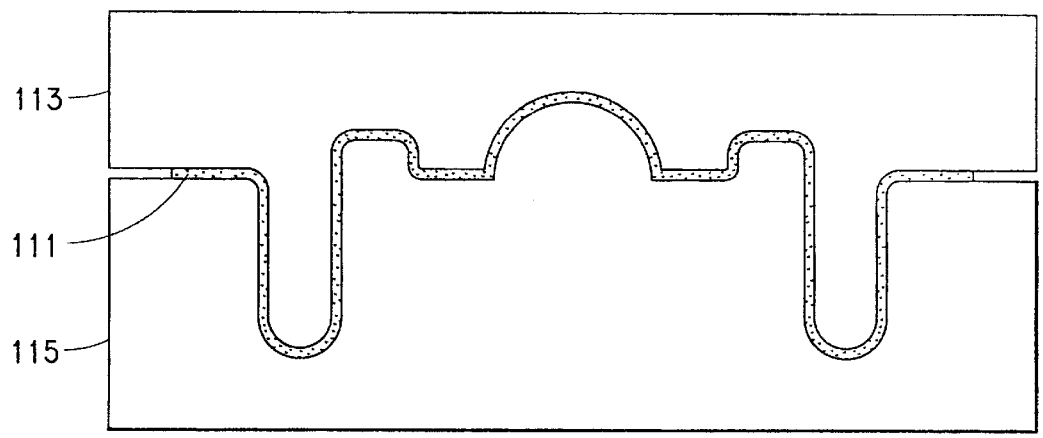
FIG. 9 is a side view in cross section of the mold of FIG. 9 wherein the extrudate has been molded.
Figure 10:
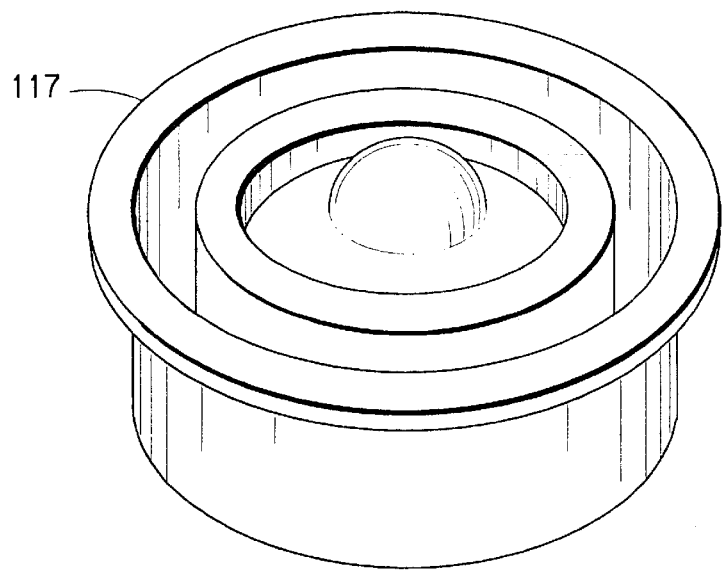
FIG. 10 is a side view in elevation of the molded article made using the mold of FIGS. 8 and 9.

Hollow articles produced with extrusion head 81 have surprisingly uniform wall thickness. Further, the lubricated green extrudate obtained has unusually well balanced anisotropic properties which result in extruded shapes that are extremely malleable and that lend themselves to transformation techniques heretofore impossible or very difficult to achieve. For example, turning to FIGS. 8–10 there is shown an example of the types of shapes that may be molded using the lubricated green extrudate obtained from the process of this invention. In FIG. 8, there is shown a sheet 111 of lubricated green extrudate suspended between complementary mold sections 113 and 115. In FIG. 9, mold sections 113 and 115 are compressed onto sheet 111, which results in a molded article 117 having a complex shape. A molded article such as article 117 made from a lubricated green extrudate may only be obtained if the extrudate has sufficient biaxial strength.

Figure 7:
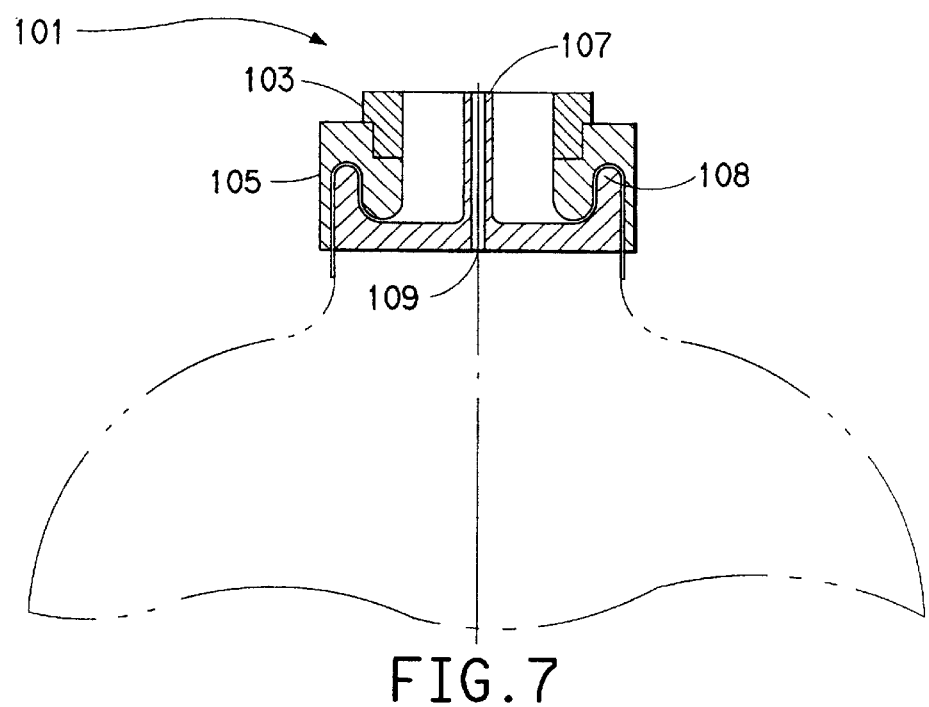
FIG. 7 is a side view in cross section of an extrusion head similar to that in FIG. 6, except there is a source of air in the extrusion head so that the hollow lubricated extrudate may be formed into a thin, porous membrane.

In FIG. 7 there is shown an extrusion head 101 having a die 105 and a tip 108 positioned in die 105. Conventionally, extrusion head 101 is attached to an extrusion device such as by barrel 103 which is connected to die 105. Tip 108 is connected to a mandrel 107 positioned in extrusion head 101. Extrusion head 101 is the same as extrusion head 81 shown in FIG. 6 except that tip 108 and mandrel 107 have an air port 109 formed therein. Air blown through air port 109 allows the diameter of the extrudate to be increased.

After the molding stage, the lubricated green extrudate may be dried and sintered, taking into account the predetermined shrinkage behavior and subsequent changes in dimensions will known with paste extrudates. One of the benefits of the inventive process is that it allows for the extrusion of large diameter PTFE pipes, which are easy to handle and which exhibit very low longitudinal shrinkage upon sintering.

While certain specific embodiments of the invention have been set forth above, it should be understood by one skilled in the art that there are many other embodiments of extrusion device designs that could be used within the scope of the present invention, so long as the lubricated PTFE fine powder, and hence the PTFE particles, are reoriented at least 60 degrees from the initial direction of flow of the lubricated PTTE fine powder during the extrusion to cause the PTFE particles to fibrillate biaxially.

EXAMPLES

A PTFE fine powder type 669-N produced by DuPont and sold for liner applications was mixed with Shellsol® K lubricant sold by the Shell Oil Co. to provide a lubricated PTFE having 81.5 weight percent PTFE and 18.5 weight percent lubricant. The same lubricated PTFE was used in each of the examples below. Before extrusion, the lubricated PTFE was shaped as a cylindrical hollow charge under low pressure which is a common method known in the art of paste extrusion of PTFE.

Comparative Example 1

Figure 1:
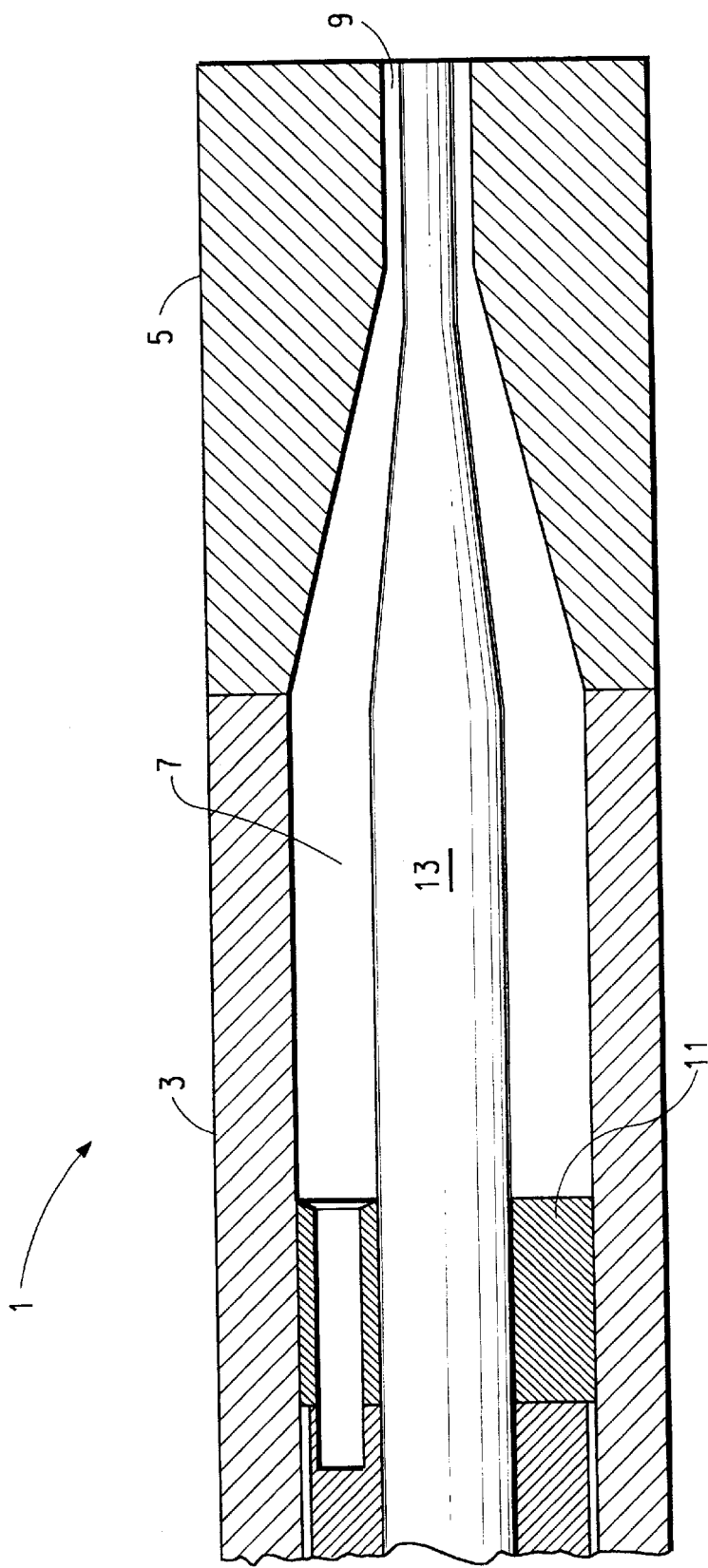
FIG. 1 is a side view in partial cross section of a prior art extrusion device for paste extruding lubricated PTFE fine powder.
Figure 2:
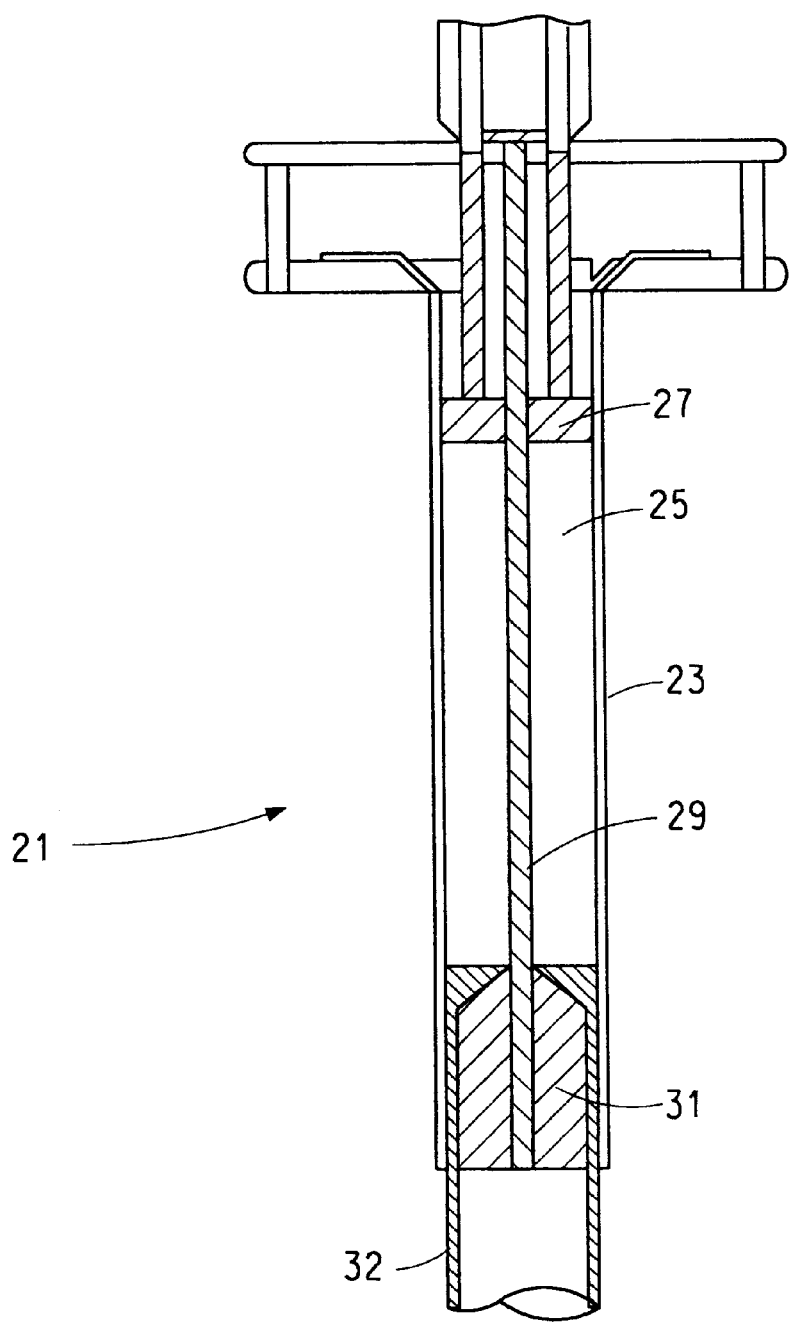
FIG. 2 is a side view in cross section of a prior art extrusion device.

A conventional die such as shown in FIG. 1 connected to a 4 inch diameter extruder barrel was used to extrude the lubricated PTFE into a PTFE tube which in its green state was mono-axially fibrillated. The green tube had a outside diameter of 8 mm and a wall thickness of 2.9 mm. Samples were cut out of the tube immediately after extrusion.

Some of these samples are folded completely without damage when the fold is made in a direction perpendicular to the direction of extrusion. Folds in other directions or orientations yield defect and cracks in the samples. The worst defects occur when the fold is parallel to the direction of extrusion.

The samples were kept in airtight containers to prevent the loss of lubricant and were subsequently submitted for tensile measurements according to method ASTM D1708. The results obtained were as follows:

TABLE 1

| Direction | Yield Strength (MPa) | Elongation (%) |
| --- | --- | --- |
| Extrusion direction | 0.55 | >1000 |
| Cross direction | 0.21 | 93 |

The results of this Example show that the lubricated green extrudate had acceptable physical properties in the extrusion direction but poor physical properties in the cross direction. Note that the measurement of the elongation is limited to a maximum of 1000%.

Example 2

The inventive extrusion head as shown in FIG. 6 having a 4 inch diameter barrel was used as in Example 1 to extrude the lubricated PTFE composition into a PTFE tube which was biaxially fibrillated in its green state. The green tube had a diameter of 94 mm and a wall thickness of 1.6. Samples were cut and measured as in Example 1. Samples were folded in every direction without defects or cracks occurring in the samples. Physical properties were also measured following ASTM D1708 with the following results:

TABLE 2

| Direction | Yield Strength (MPa) | Elongation (%) |
|---|---|---|
| Extrusion direction | 1.0 | >1000 |
| Cross direction | 0.4 | >1000 |

Compared to the conventional extrusion process of Example 1, it may be seen that lubricated green extrudate made using the inventive process exhibited an almost 200% increase in the yield strength in both the extrusion and cross directions, and exhibited an increase from 93% to above 1000% elongation in the cross direction. In other words, the lubricated green extrudate made using the inventive process was elastic in all directions, which resulted in an extrudate that was much more malleable than the lubricated green extrudate made by a conventional process such as set forth in Example 1.

Example 3

Example 2 was repeated except that the lubricated green extrudate obtained had a thickness of 2.3 mm. The physical properties of this extrudate are set forth below.

TABLE 3

| Direction | Yield Strength (MPa) | Elongation (%) |
|---|---|---|
| Extrusion direction | 0.5 | >1000 |
| Cross direction | 0.4 | >1000 |

These results show that the lubricated green extrudate had excellent physical properties that were also very well balanced. The properties in the cross direction were significantly improved compared to the properties in the cross direction obtained using the conventional extrusion process of Example 1.

Comparative Example 4

The lubricated green extrudate liner of Example 1 die was subsequently finished from its green state by sintering in a circulating air oven at 380° C. for 2 hours. The wall thickness of the tube decreased from 2.9 mm to 2.3 mm, and the longitudinal shrinkage was 24%. Physical properties were again measured according to ASTM method D 1708.

TABLE 4

| Direction | Yield strength (Mpa) | Tensile strength (MPa) | Elongation at break (%) |
|---|---|---|---|
| Extrusion direction | 13.4 | 34.7 | 375 |
| Cross direction | 12.9 | 37.2 | 453 |

Example 5

The lubricated green extrudate tube produced in Example 2 was finished by sintering in a circulating air oven at 380° C. for two hours. The thickness increased from 1.6 to 2.1 mm, and the longitudinal shrinkage was 11%. Physical properties were measured by ASTM D 1708:

TABLE 5

| Direction | Yield strength (MPa) | Tensile strength (MPa) | Elongation at break (%) |
|---|---|---|---|
| Extrusion direction | 13.0 | 37.3 | 407 |
| Cross direction | 12.8 | 42.7 | 460 |

Compared to the results obtained in Example 4 using a conventional extrusion process, the extrusion process of the invention set forth in Example 5 resulted in a sintered tube that showed improvements in longitudinal shrinkage, tensile strength and % break at elongation.

Example 6

The lubricated green extrudate tube produced in Example 3 was finished by sintering at 380° C. for two hours. The thickness decreased from 2.3 to 2.1 mm and the longitudinal shrinkage was 15%. The physical properties were measured by ASTM D 1708.

TABLE 6

| Direction | Yield strength (MPa) | Tensile strength (MPa) | Elongation at break (%) |
|---|---|---|---|
| Extrusion direction | 13.0 | 37.8 | 444 |
| Cross direction | 13.5 | 32.8 | 360 |

Again, as compared to the results obtained in Example 4 using a conventional extrusion process, the extrusion process of the invention set forth in Example 6 resulted in a sintered tube that showed a decrease in longitudinal shrinkage from 24 to 15%.

What is claimed is:

1. An extrusion head for use in the paste extrusion of lubricated PTFE fine powder, said extrusion head comprising an external die having an inlet, a chamber, and an outlet, a tip positioned in the chamber of the external die, said tip having a circumferential ridge formed therein that extends into the chamber, said chamber having a shape complementary to the ridge so as to form a space between the external die and the tip to allow lubricated PTFE fine powder to pass therethrough, the space between the external die and the tip causing the lubricated fine powder passing up and over the ridge to be reoriented in a first direction generally opposite an initial direction and then reoriented again in a generally opposite second direction that is approximately the same as the initial direction and a mandrel which extends through the external die and supports the tip in the chamber.

* * * * *